March 5, 1968

G. E. THOMAS, JR., ET AL 3,372,127

BORON-LOADED LIQUID SCINTILLATOR

Filed Feb. 12, 1965

INVENTORS
George E. Thomas, Jr.
Harold E. Jackson, Jr.
By:
Attorney

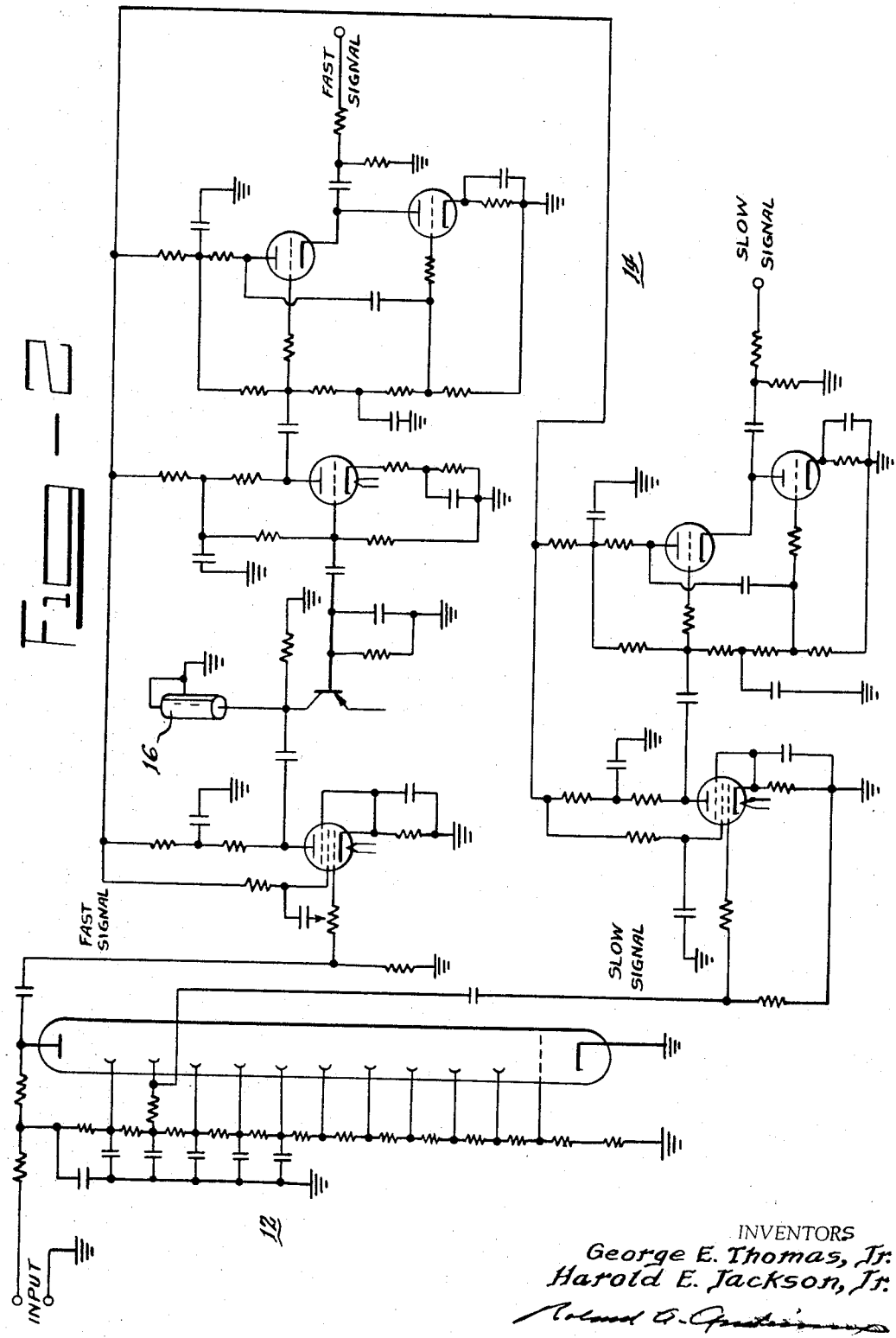

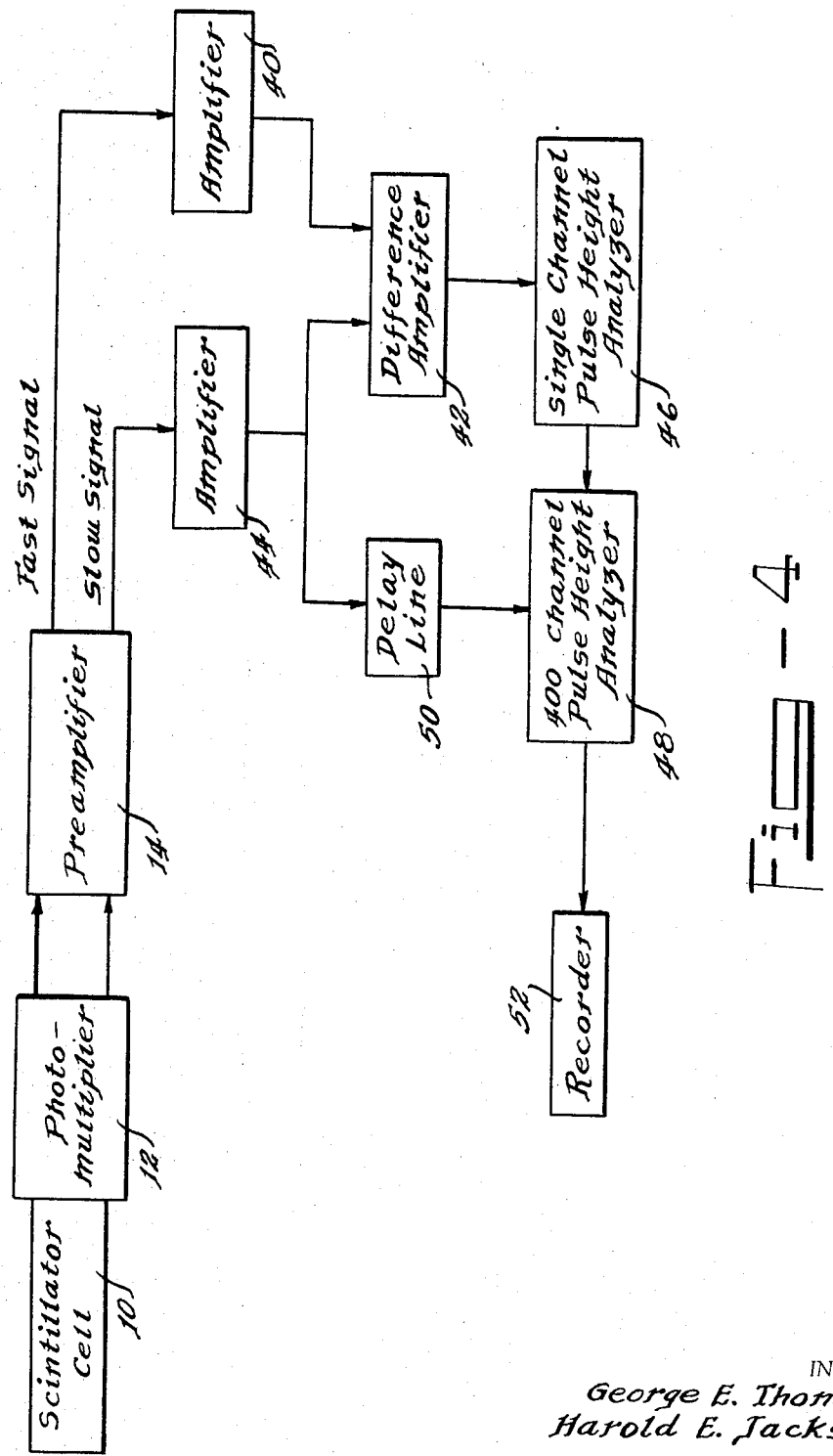

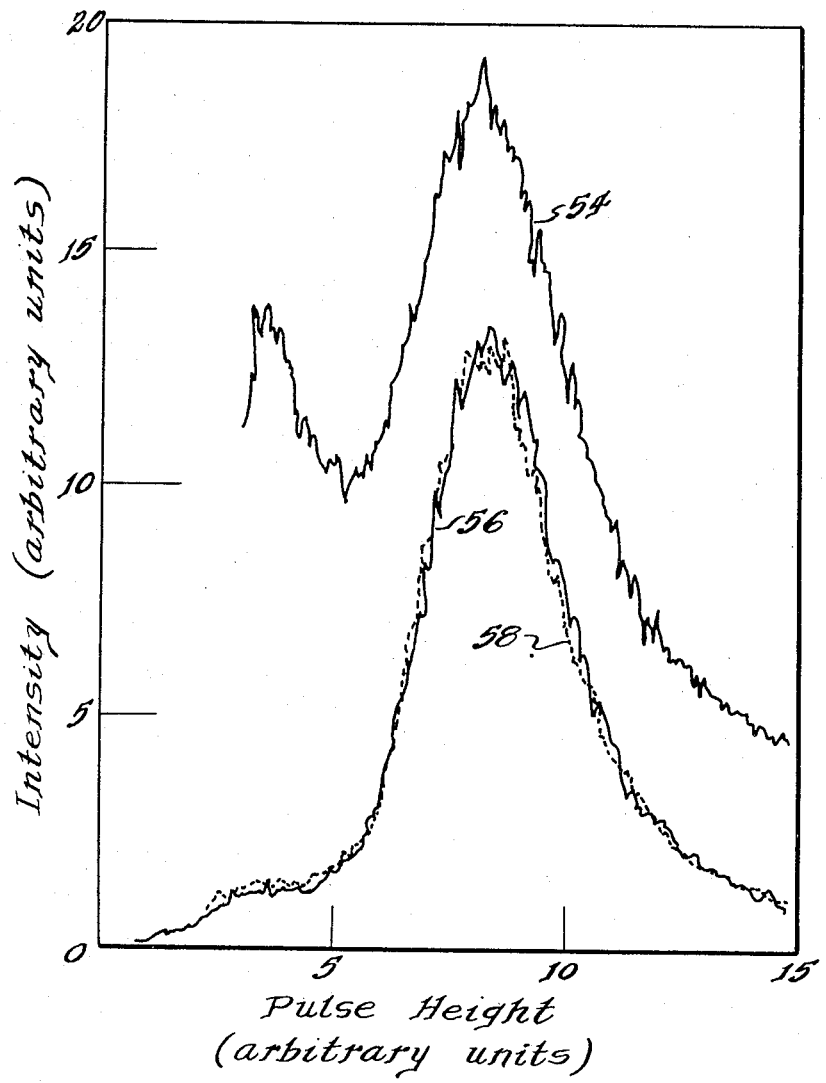

United States Patent Office 3,372,127
Patented Mar. 5, 1968

3,372,127
BORON-LOADED LIQUID SCINTILLATOR
George E. Thomas, Jr., Naperville, and Harold E. Jackson, Jr., Elmhurst, Ill., assignors to the United States of America as represented by the United States Atomic Energy Commission
Filed Feb. 12, 1965, Ser. No. 432,436
4 Claims. (Cl. 252—301.2)

ABSTRACT OF THE DISCLOSURE

A liquid scintillator which differentiates between radiation due to slow neutrons and gamma rays comprising a solvent of either toluene, xylene, mineral oil or isopropyl biphenyl containing 40 to 50 weight percent trimethyl borate and saturated with 9,10-diphenyl anthracene and naphthalene.

---

The invention described herein was made in the course of, or under, a contract with the U.S. Atomic Energy Commission.

This patent relates to boron-loaded liquid scintillation counters and more particularly to an improved liquid scintillator for use therein.

In slow neutron spectroscopy, experiments are performed which require the detection of thermal or resonance neutrons in the presence of a substantial gamma ray background. Such experiments may be measurements of resonance-neutron scattering cross sections and transmission measurements made with neutron choppers. In these experiments, the most important characteristics of a satisfactory detector are effective discrimination against background radiation, large sensitive area, high neutron efficiency, and ordinarily only moderate timing resolution.

The boron-loaded liquid scintillation counter is a detector which is most promising in meeting the above-mentioned characteristics. In the boron-loaded liquid, neutrons are observed through the $B^{10}$ $(n, \alpha)$ $Li^7$ reaction which follows moderation of the neutrons by the liquid. Neutron events are distinguished from gamma ray events by the differences in the shapes of light pulses produced by electrons and nuclear reaction products. Thus, pulse-shape discrimination may be used to reject counts from unwanted gamma rays. However, the liquid scintillators presently used in this type of counter are sensitive to gamma rays and rejection of gamma rays therewith may be accomplished only at the expense of lower neutron efficiency.

It is therefore one object of the present invention to provide a liquid scintillator for a boron-loaded liquid scintillation counter which scintillator has a lower sensitivity to gamma rays than heretofore.

It is another object of the present invention to provide a liquid scintillator for a boron-loaded liquid scintillation counter which scintillator has low sensitivity to gamma rays and high neutron efficiency.

Other objects of the present invention will become more apparent as the detailed description proceeds.

Understanding of the present invention will be furthered by consideration of the accompanying drawings in which:

FIGURE 2 is a detailed schematic diagram of a portion of the apparatus of FIGURE 1.

FIGURE 4 is a block diagram of a second apparatus used to evaluate the present invention.

FIGURE 5 is a graphical plot of the response of the present invention to neutron events in high gamma ray background.

Figure 1:
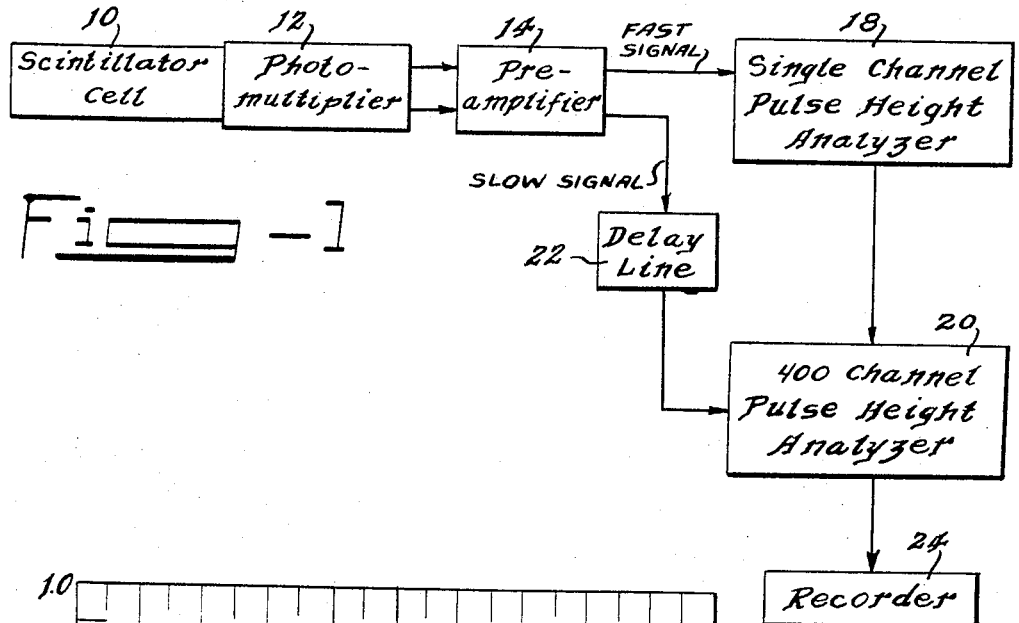
FIGURE 1 is a block diagram of an apparatus used to evaluate the present invention.

The liquid scintillator of the present invention has a composition comprising trimethyl borate, isopropyl biphenyl, naphthalene and 9,10-diphenyl anthracene. This scintillator was compared with existent liquid scintillators under identical instrumental conditions. The composition by weight of the liquid scintillators compared was as follows:

Liquid A—2-phenyl-5-(4-biphenylyl)-1,3,4-oxadiazole (0.4%); isopropyl biphenyl (49.3%); enriched trimethyl borate (0.95 $B^{10}$) (49.3%); 1,4-di-[2-(5-phenyloxazolyl)]-benzene (20 mg./liter).

Liquid B—2-phenyl-5-(4-biphenylyl)-1,3,4-oxadiazole (1.2%); naphthalene (21.7%); enriched trimethyl borate (0.95 $B^{10}$) (46.5%); isopropyl biphenyl (30.6%).

Liquid C—2-(1-naphthyl)-5-phenyloxazole (1.2%); naphthalene (21.7%); enriched trimethyl borate (0.95 $B^{10}$) (46.5%); isopropyl biphenyl (30.6%).

Liquid D—9,10-diphenyl anthracene (1.2%); naphthalene (21.7%); enriched trimethyl borate (0.95 $B^{10}$) (46.5%); isopropyl biphenyl (30.6%).

The test equipment used to evaluate the liquids is standard in the art and is shown in schematic form in FIGURE 1. To insure that the pulse shapes of the four liquids were surveyed under identical instrument conditions, a refillable cylindrical cell 10 with a quartz glass end window was used in the counting volume. The walls of the cell 10 were coated with an $Al_2O_3$ light reflector. The cell 10, two inches in diameter and one inch deep, was optically coupled to the photocathode of a photomultiplier tube 12 with a high-viscosity clear silicone grease. Since oxygen quenches the slow component of light in organic scintillators, dry nitrogen gas was bubbled through the test liquids prior to their insertion into the cell 10 in an oxygen-free atmosphere. A 10-minute bubbling period was found sufficient to reduce the concentration of oxygen to a level which did not produce detectable quenching.

A one-curie PoBe source contained in an eight-liter volume of paraffin served as a source of resonance and thermal neutrons. To compare the pulse output shapes from the test liquids, the charge integrated in a variable initial time interval was compared with the total charge of the pulse. Two outputs were taken from the photomultiplier 12 via different dynode stages therein. One output, hereinafter called the fast signal, was fed to one channel of a two-channel preamplifier 14. The other output, hereinafter called the slow signal, was fed to the other channel of the preamplifier 14.

The photomultiplier 12 and preamplifier 14 are shown in detailed schematic form in FIGURE 2. The preamplifier 14 operated to clip the fast signal in the plate of the preamplifier and stretch the clipped pulse with a diode stretcher. The clipping time was controlled by the lengths of a shorted delay line 16. The other channel of the preamplifier 14 amplified the slow signal with no clipping.

The fast signal output from preamplifier 14 was fed to a single channel pulse height analyzer 18 wherefrom an output pulse was generated whenever the height of the fast signal fell within a preset tolerance value. The output from single channel pulse height analyzer 18 was then fed to a four hundred channel pulse height analyzer 20 where it acted as a trigger. The slow signal output from preamplifier 14 was delayed by a delay line 22 and fed to the input of analyzer 20. The amount of delay given to the slow signal was that required to bring it in coincidence with the trigger input from analyzer 18. Thus, analyzer 20 analyzed pulses wherefor a trigger input was received. The output of analyzer 20 was fed to a recorder 24.

The apparatus of FIGURE 1, therefore, compared the total charge for gamma and neutron events for which the fast components were equal in magnitude. The sensitivity of the fast signal to the amount of charge in the fast component depends on the length of the clipping line used to generate it and is greatest for the shortest clipping times. However, the clipping time cannot be too small or the number of photoelectrons produced will not be sufficient to permit an effective pulse shape analysis. The optimum clipping times for test liquids A, B, C and D were found to be 22, 22, 22 and 44 nanoseconds, respectively.

Using the above-identified clipping times and the circuit of FIGURE 1, the usefulness of the test liquids for pulse shape discrimination was evaluated on the basis of the overlap of the gamma ray and neutron distribution. The results are shown graphically in FIGURE 3. Curves 30A, 32A, 34A and 36A are the response of liquids A, B, C and D, respectively, to gamma rays. Curves 30B, 32B, 34B and 36B are the response of liquids A, B, C and D, respectively, to neutrons. It is readily obvious that of the four test liquids, test liquid D produced maximum separation of the gamma ray and neutron distribution. In fact, the results of test liquid D were such that almost complete separation of gamma ray and neutron pulses may be effected therewith using pulse-shape discrimination.

The characteristics of the four test liquids A, B, C and D are listed in the following table.

| Liquid | Relative pulse height (neutrons) | Mean decay time (nsec) | Relative fast comp. | Reduction factor (Eff$_{neutron}$= 95%) |
|---|---|---|---|---|
| (A) | 0.58 | 100 | 1.06 | 1.2 |
| (B) | 0.83 | 100 | 1.15 | 2 |
| (C) | 0.84 | 110 | 1.27 | 5 |
| (D) | 1.00 | 120 | 1.62 | 500 |

The "Relative fast component" is a figure of merit for the liquids. It is the ratio of the fraction of light in the fast signal for gamma ray pulses to the fraction of the light in the fast signal for neutron pulses. Pulse shape discrimination is most effective in solutions for which this figure is the largest. Also listed in the table are the mean decay times and the relative means pulse heights for neutrons of each of the test liquids.

Figure 3:
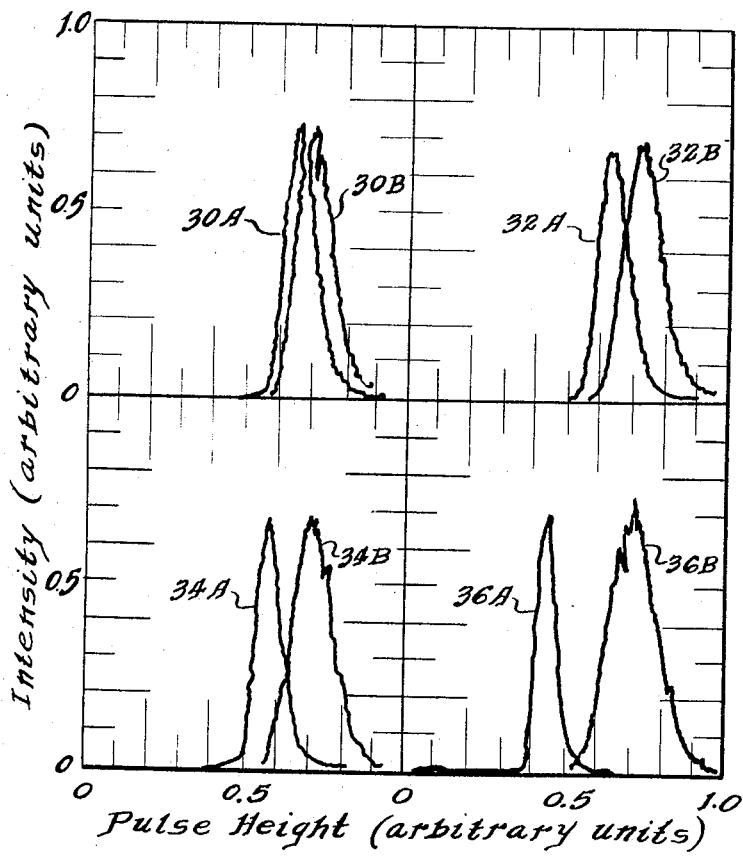
FIGURE 3 is a graphical plot of the response of four test liquids to gamma and neutron radiation.

The maximum attainable reduction in gamma ray sensitivity for a given reduction in neutron sensitivity in a system can be estimated from the overlap of the distributions shown in FIGURE 3. The results of such a calculation for test liquids A, B, C and D are given in the column entitled, "Reduction factor," in the prior listed table. These values represent the maximum reduction in gamma ray sensitivity which can be achieved without decreasing the neutron efficiency more than 5%.

The test liquid D was further evaluated using the circuit of FIGURE 4 to measure a neutron spectrum in a high gamma ray background. The cell 10, photomultiplier 12 and preamplifier 14 are the same as shown in FIGURE 1. The fast signal output of preamplifier 14, a clipped signal as hereinbefore described, was fed via amplifier 40 to one input of a difference amplifier 42. The slow signal output from preamplifier 14 was fed via an amplifier 44 to the other input of difference amplifier 44. The output from amplifier 44, the difference between the fast and slow signal amplitudes, was fed to the input of a single channel pulse height analyzer 46. Since the integrated charge as a function of time for neutron and gamma events is faster for gamma than for neutron pulses, the charge in a given time period will be greater for gamma pulses than neutron pulses. Thus, by biasing the single channel pulse height analyzer 46 at a predetermined value, discrimination was thereby effected to determine if a neutron or a gamma ray event had occurred. The amount of bias used in the analyzer 46 depended on the characteristics of the amplifiers used. Thus, where the output signal of difference amplifier 44 was greater than the determined value, no output resulted from analyzer 46, thereby indicating a gamma ray event. Where the output from difference amplifier 44 was less than the determined value, an output resulted from analyzer 46 indicating a neutron event.

The output from the single channel pulse height analyzer 46 was fed as a trigger to an input of a four hundred channel pulse height analyzer 48. The slow signal output from preamplifier 14 was also fed via a delay line 50 to an input of the four hundred channel pulse height analyzer 48. The amount of delay occasioned the slow signal was that required to bring the signal in coincidence with the trigger input from analyzer 46. The trigger from analyzer 46 gated analyzer 48 on whenever a neutron event occurred so that the slow signal output thereof from preamplifier 14 was analyzed by analyzer 48. A recorder 52 was connected to the output of analyzer 48.

The plots in FIGURE 5 illustrate the results obtained with the apparatus of FIGURE 4 with and without pulse-shape discrimination. To eliminate pulse-shaped discrimination, the bias on analyzer 46 was adjusted so that all output from difference amplifier 44 triggered analyzer 48.

Curve 54 illustrates a neutron spectrum obtained in the presence of high gamma ray background with no pulse-shape discrimination using the test liquid D hereinbefore described. Curve 56 illustrates the same neutron spectrum in the presence of the same high gamma ray background with pulse-shape discrimination. Curve 58 illustrates the same neutron spectrum without the gamma ray background or pulse-shape discrimination. These curves readily show the effectiveness of test liquid D of the present invention in discriminating against gamma ray background.

It is to be noted that the nature of the solvent in the liquid scintillator of the present invention has no effect on pulse shapes provided it does not quench the excitation. Toluene, xylene and ordinary mineral oil were substituted as solvents in place of the isopropyl biphenyl with no observable effect on performance. Further, the stated compositions by weight of the substances in the liquid scintillator are not critical. The 9,10-diphenyl anthracene is close to saturation in its stated composition by weight of 1.2%. Its composition by weight may be increased to saturation or decreased by 30% of the 1.2% without any appreciable effect on the performance of the scintillator. The napthalene is at saturation in the liquid in the composition by weight of 21.7%. The lower the concentration of naphthalene, the lower the pulse height obtainable. However, the concentration by weight thereof may be decreased approximately 15% of the 21.7% without impairing the sensitivity of discrimination.

Trimethyl borate affects the efficiency of the scintillator; the more boron the greater the efficiency. In test liquid D, enriched trimethyl borate (.95 B$^{10}$) was used for increased efficiency at the stated composition by weight of 46.5%. Normal trimethyl borate may be used in place of the enriched trimethyl borate with the same composition by weight (46.5%). If this is done, the efficiency of the scintillator is lowered but the ability of the liquid to discriminate between gamma rays and neutrons will not be impaired.

The amount of isopropyl biphenyl in solution with the trimethyl borate affects the height of the pulse. The higher the ratio of trimethyl borate to isopropyl biphenyl in the composition by weight, the smaller the pulse and the lower the ratio the higher the pulse. Thus, the quantities of these two substances (trimethyl borate and isopropyl biphenyl) must therefore be balanced in the scintillator to give optimum performance. The previously stated compositions by weight thereof (46.5% and 30.6%) may be varied plus or minus 15% of their values without impairing their balance.

It will be understood that this invention is not be limited to the details given herein, but that it should be determined only in accordance with the appended claims.

The embodiments of the invention in which an exclusive property or privilege is claimed are defined as follows:

1. A liquid scintillator composition comprising 39.52 to 53.48 weight percent trimethyl borate, 18.44 to 21.7 weight percent naphthalene, 0.84 to 1.2 weight percent 9,10-diphenyl anthracene and the balance selected from the group consisting of isopropyl biphenyl, toluene, mineral oil and xylene.

2. The composition according to claim 1 wherein said trimethyl borate is present in a concentration of 46.5 percent by weight, said naphthalene is present in a concentration of 21.7 percent by weight, said 9,10-diphenyl anthracene is present in a concentration of 1.2 percent by weight and said selected compound is present in a concentration of 30.06 percent by weight.

3. A liquid scintillator composition comprising 39.52 to 53.48 weight percent enriched trimethyl borate, 18.44 to 21.7 weight percent naphthalene, 0.84 to 1.2 weight percent 9,10-diphenyl anthracene and 26.01 to 35.19 weight percent isopropyl biphenyl.

4. The composition according to claim 3 wherein said enriched trimethyl borate is present in a concentration of 46.5 percent by weight, said naphthalene is present in a concentration of 21.7 percent by weight, said 9,10-diphenyl anthracene is present in a concentration of 1.2 percent and said isopropyl biphenyl is present in a concentration of 30.6 percent by weight.

References Cited

UNITED STATES PATENTS

| | | | |
|---|---|---|---|
| 2,755,253 | 7/1956 | Muehlhause et al. | 252—301.2 |
| 3,068,178 | 12/1962 | Kallman et al. | 252—301.2 |

TOBIAS E. LEVOW, *Primary Examiner.*

ROBERT D. EDMONDS, JAMES E. POER, *Examiners.*